(12) United States Patent
Shiratsuki et al.

(10) Patent No.: US 11,279,299 B2
(45) Date of Patent: Mar. 22, 2022

(54) CAMERA HOLDER AND METHOD OF ATTACHING A CAMERA HOLDER

(71) Applicants: Kabushiki Kaisha Toshiba, Tokyo (JP); Toshiba Infrastructure Systems & Solutions Corporation, Kanagawa (JP)

(72) Inventors: Masaki Shiratsuki, Kanagawa (JP); Nobuyuki Kumakura, Kanagawa (JP); Yoko Yonekawa, Tokyo (JP); Takahiko Yamazaki, Chiba (JP)

(73) Assignees: Kabushiki Kaisha Toshiba, Tokyo (JP); Toshiba Infrastructure Systems & Solutions Corporation, Kanagawa (JP)

( * ) Notice: Subject to any disclaimer, the term of this patent is extended or adjusted under 35 U.S.C. 154(b) by 81 days.

(21) Appl. No.: 16/749,355

(22) Filed: Jan. 22, 2020

(65) Prior Publication Data
US 2020/0156559 A1  May 21, 2020

Related U.S. Application Data

(63) Continuation of application No. PCT/JP2018/017741, filed on May 8, 2018.

(30) Foreign Application Priority Data

Jul. 25, 2017  (JP) .............................. JP2017-143846

(51) Int. Cl.
*B60R 11/04* (2006.01)
*B60R 9/048* (2006.01)
(Continued)

(52) U.S. Cl.
CPC .............. *B60R 11/04* (2013.01); *B60R 9/048* (2013.01); *G03B 17/02* (2013.01); *G03B 17/56* (2013.01);
(Continued)

(58) Field of Classification Search
CPC ... B60R 11/04; B60R 9/048; B60R 2011/004; B60R 2011/0042; G03B 17/02;
(Continued)

(56) References Cited

U.S. PATENT DOCUMENTS 5,835,808 A * 11/1998 Parker .................... B60R 11/04
396/419
7,733,370 B2 * 6/2010 Werth .................... B60Q 1/245
348/148

(Continued)

FOREIGN PATENT DOCUMENTS

JP  04-022351 U  2/1992
JP  H04213442  *  8/1992  ............. G03B 17/56
(Continued)

OTHER PUBLICATIONS

International Search Report issued in PCT Application No. PCT/JP2018/017741 dated Aug. 7, 2018, 4 pages (with translation).

*Primary Examiner* — Clayton E. LaBalle
*Assistant Examiner* — Kevin C Butler
(74) *Attorney, Agent, or Firm* — Baker Botts L.L.P.

(57) ABSTRACT

According to one embodiment, a camera holder has a universal head, a fixing member, a fall prevention member, and a coupling member. A camera is attached to the universal head. The universal head is able to adjust a tilting angle of the camera. The fixing member is detachably adsorbed to a vehicle body. The fixing member fixes the universal head to the vehicle body such that a horizontal image capturing angle of the camera attached to the universal head is able to be adjusted. The fall prevention member has an adsorption portion. The adsorption portion is detachably attached to a place spaced apart from an attachment place of the fixing member and on an upper surface of the vehicle body in front of the fixing member. A coupling member causes the fixing (Continued)

member and the fall prevention member to be coupled to each other.

6 Claims, 7 Drawing Sheets

(51) Int. Cl.
    *G03B 17/02*     (2021.01)
    *G03B 17/56*     (2021.01)
    *B60R 11/00*     (2006.01)
    *B64D 47/08*     (2006.01)
    *F16M 11/18*     (2006.01)
    *G03B 15/00*     (2021.01)
    *G02B 27/64*     (2006.01)

(52) U.S. Cl.
    CPC . *B60R 2011/004* (2013.01); *B60R 2011/0042* (2013.01); *B64D 47/08* (2013.01); *F16M 11/18* (2013.01); *G02B 27/64* (2013.01); *G03B 15/00* (2013.01); *G03B 15/006* (2013.01)

(58) Field of Classification Search
    CPC ...... G03B 17/56; G03B 15/00; G03B 15/006; B64D 47/08; G02B 27/64; F16M 11/18
    USPC .............................................. 369/12; 396/12
    See application file for complete search history.

(56) References Cited

U.S. PATENT DOCUMENTS

| | | | |
|---|---|---|---|
| D665,651 S * | 8/2012 | Richter | D8/354 |
| 8,584,995 B2 * | 11/2013 | Russell | G03B 17/561 |
| | | | 248/177.1 |
| 10,479,288 B2 * | 11/2019 | Nelson | F16M 11/16 |
| 2006/0256459 A1 * | 11/2006 | Izabel | B60S 1/566 |
| | | | 359/872 |
| 2014/0016922 A1 * | 1/2014 | Greenthal | H04N 5/23299 |
| | | | 396/419 |
| 2016/0083110 A1 * | 3/2016 | Pan | A45F 5/10 |
| | | | 348/144 |
| 2020/0109813 A1 * | 4/2020 | Geerds | F16M 11/2078 |
| 2020/0156559 A1 * | 5/2020 | Shiratsuki | G03B 17/561 |

FOREIGN PATENT DOCUMENTS

| | | | | |
|---|---|---|---|---|
| JP | H07-304390 A | | 11/1995 | |
| JP | 3029339 U | | 7/1996 | |
| JP | H11-249230 A | | 9/1999 | |
| JP | 2004-120518 A | | 4/2004 | |
| JP | 2004120518 | * | 4/2004 | ............... B60R 1/00 |
| JP | 2004-320492 A | | 11/2004 | |
| JP | 2005-239109 A | | 9/2005 | |
| JP | 2007-500096 A | | 1/2007 | |
| JP | 2008-046065 A | | 2/2008 | |
| JP | 2017-504983 A | | 2/2017 | |
| WO | 2015/165022 A1 | | 11/2015 | |

\* cited by examiner

CAMERA HOLDER AND METHOD OF ATTACHING A CAMERA HOLDER

CROSS-REFERENCE TO RELATED APPLICATION

This is a Continuation Application of International Application No. PCT/JP2018/017741, filed on May 8, 2018, and the entire contents of the aforementioned application are incorporated herein by reference.

FIELD

Embodiments described herein relate generally to a camera holder.

BACKGROUND

Conventionally, regarding a method of monitoring road surface conditions such as cracking, depressions (ruts or the like), and holes on a road surface, there is a method of analyzing an image (video image) of a road surface captured while a vehicle with a camera attached thereto is traveling. However, in a method of such a kind, there may be a need to use a dedicated vehicle to which a camera or the like is attached.

DETAILED DESCRIPTION

According to one embodiment, a camera holder including a universal head, a fixing member, a fall prevention member, and a coupling member. A camera is attached to the universal head. The universal head is able to adjust a tilting angle of the camera. The fixing member is detachably adsorbed to a vehicle body. The fixing member fixes the universal head to the vehicle body such that a horizontal image capturing angle of the camera attached to the universal head is able to be adjusted. The fall prevention member has an adsorption portion. The adsorption portion is detachably attached to a place spaced apart from an attachment place of the fixing member and on an upper surface of the vehicle body in front of the fixing member. The coupling member causes the fixing member and the fall prevention member to be coupled to each other.

Hereinafter, a camera holder 1 of an embodiment will be described with reference to the drawings. In the following description, forward, rearward, upward, downward, left, and right directions are the same as the forward, rearward, upward, downward, left, and right directions in a vehicle to which the camera holder 1 is attached. In the diagram, the arrow UP indicates the upper side, the arrow FR indicates the front side, and the arrow LH indicates the left side, respectively.

Figure 1:
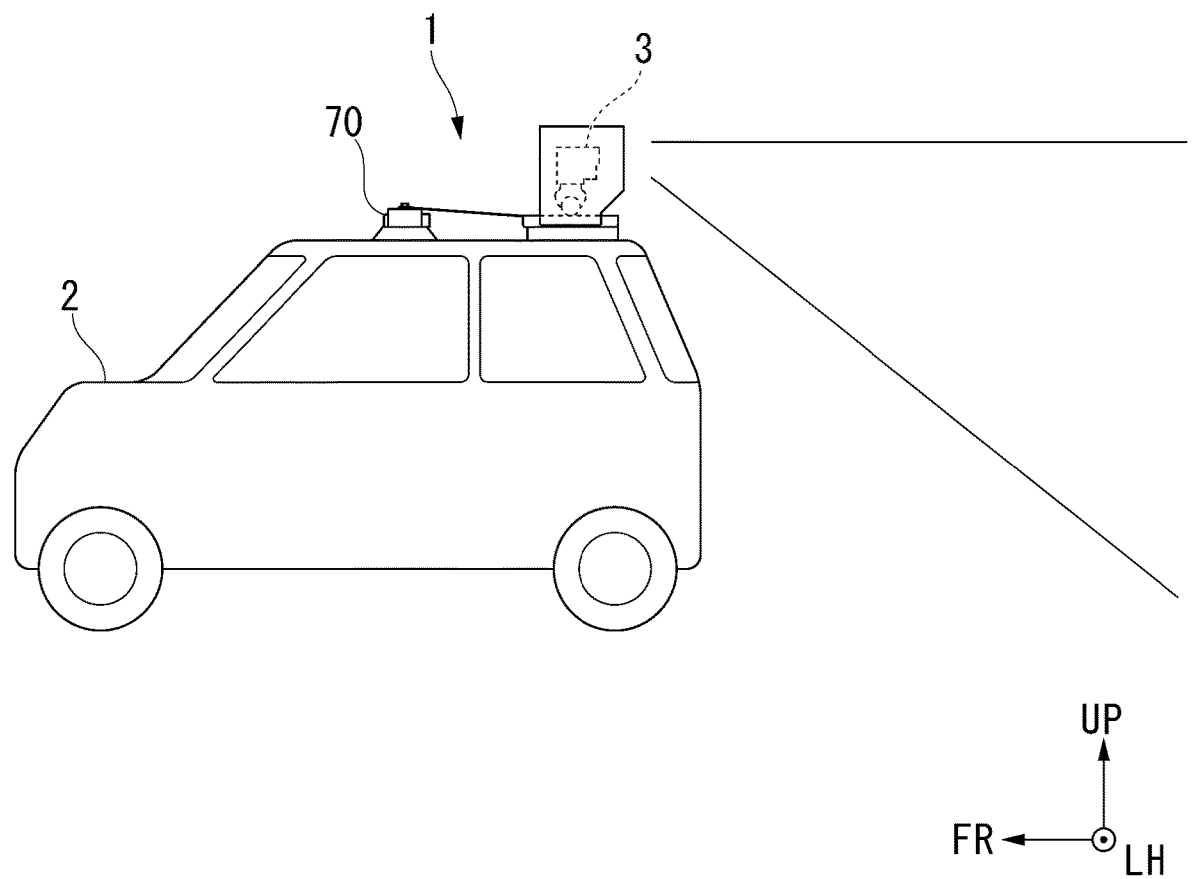
FIG. 1 is a side view showing a camera holder of an embodiment.

An overview of the camera holder 1 of the embodiment will be described. FIG. 1 is a side view showing a state where a camera holder of the embodiment is attached to a vehicle body. As shown in FIG. 1, the camera holder 1 is a device of fixing a video camera (which will hereinafter be simply referred to as a camera) 3 to a rear portion of a vehicle body 2 in order to capture an image of a road surface behind the vehicle using the camera 3. The camera holder 1 is attached to a central portion in the left-right direction on an upper surface of the rear portion of the vehicle body 2. In the following description, a case where the camera holder 1 is attached to a horizontal surface on the upper surface of the vehicle body 2 will be described as an example.

Figure 2:
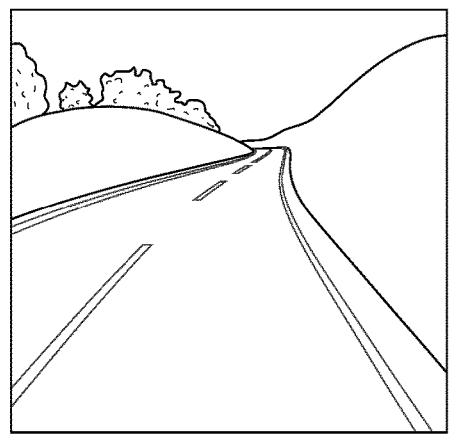
FIG. 2 is a view showing an example of a video image of a road surface captured by a camera.

FIG. 2 is a view showing an example of a video image of a road surface captured by the camera held by the camera holder of the embodiment. As shown in FIG. 2, a video image of a road surface captured by the camera 3 is an image captured by adjusting the direction of the camera such that an image of a road surface of a traveling lane on one side is captured. That is, when the vehicle travels in the middle of a lane on one side, the direction of the camera 3 is adjusted such that an image of a centerline is captured substantially at the left end in the diagram. In addition, the direction of the camera 3 is adjusted such that an image of an outer line of the lane on the left side in the traveling direction of the vehicle is captured at the right end in the diagram. It is possible to acquire an image capturing a necessary and sufficient range of a road surface by focusing the direction of the camera 3 on the image capturing range.

Figure 3:
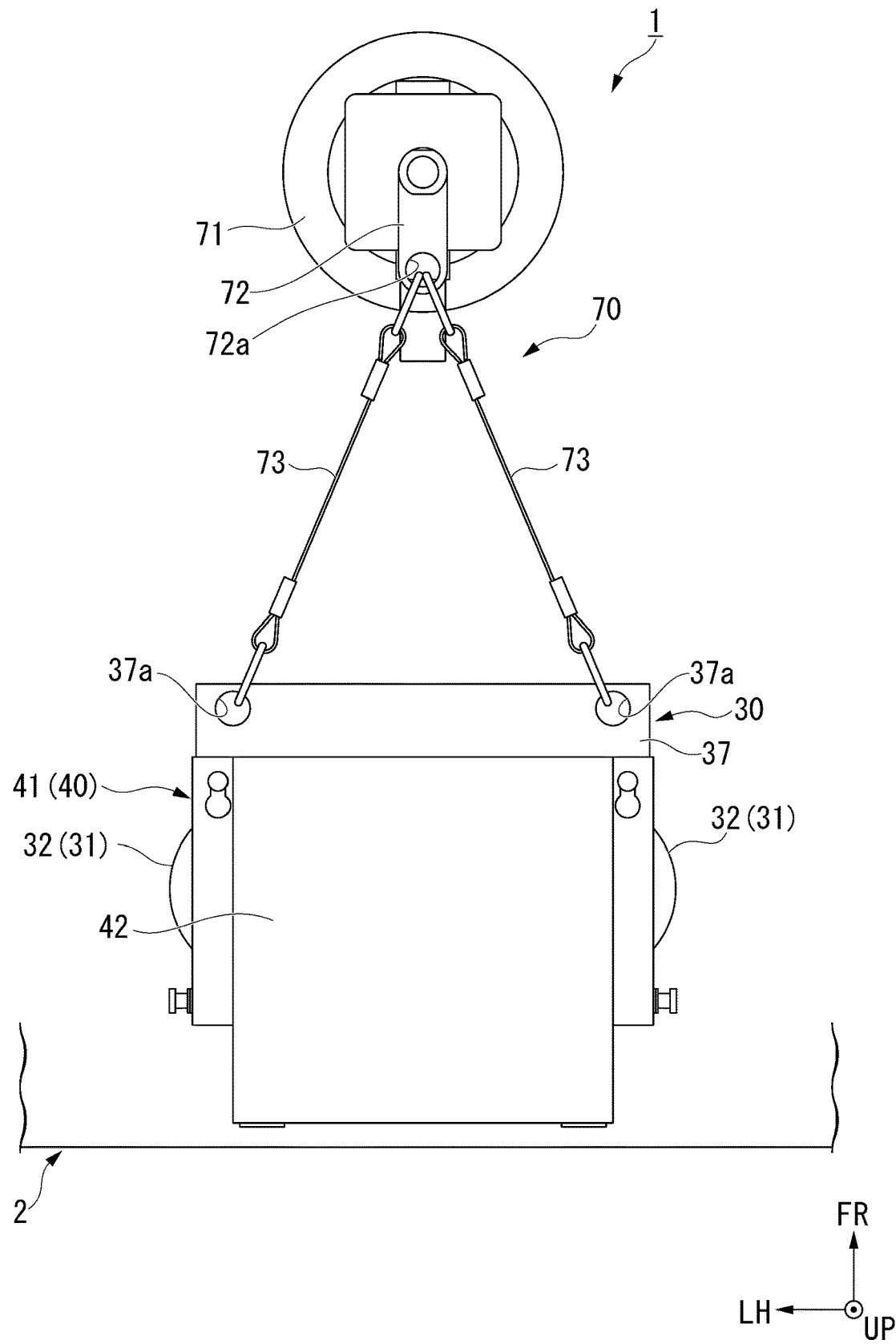
FIG. 3 is a plan view showing the camera holder of the embodiment.

A schematic configuration of the camera holder 1 of the embodiment will be described. FIG. 3 is a plan view of the camera holder of the embodiment viewed from above. As shown in FIG. 3, the camera holder 1 includes a fixing member 30 fixed to the vehicle body 2, a cover 40 attached to the fixing member 30, and a fall prevention member 70 preventing the fixing member 30 from falling off from the vehicle body 2. Here, the fall prevention member 70 includes an auxiliary adsorption portion 71 fixed to the vehicle body 2 in front of the fixing member 30, and coupling members 73 coupled to the fixing member 30.

Figure 4:
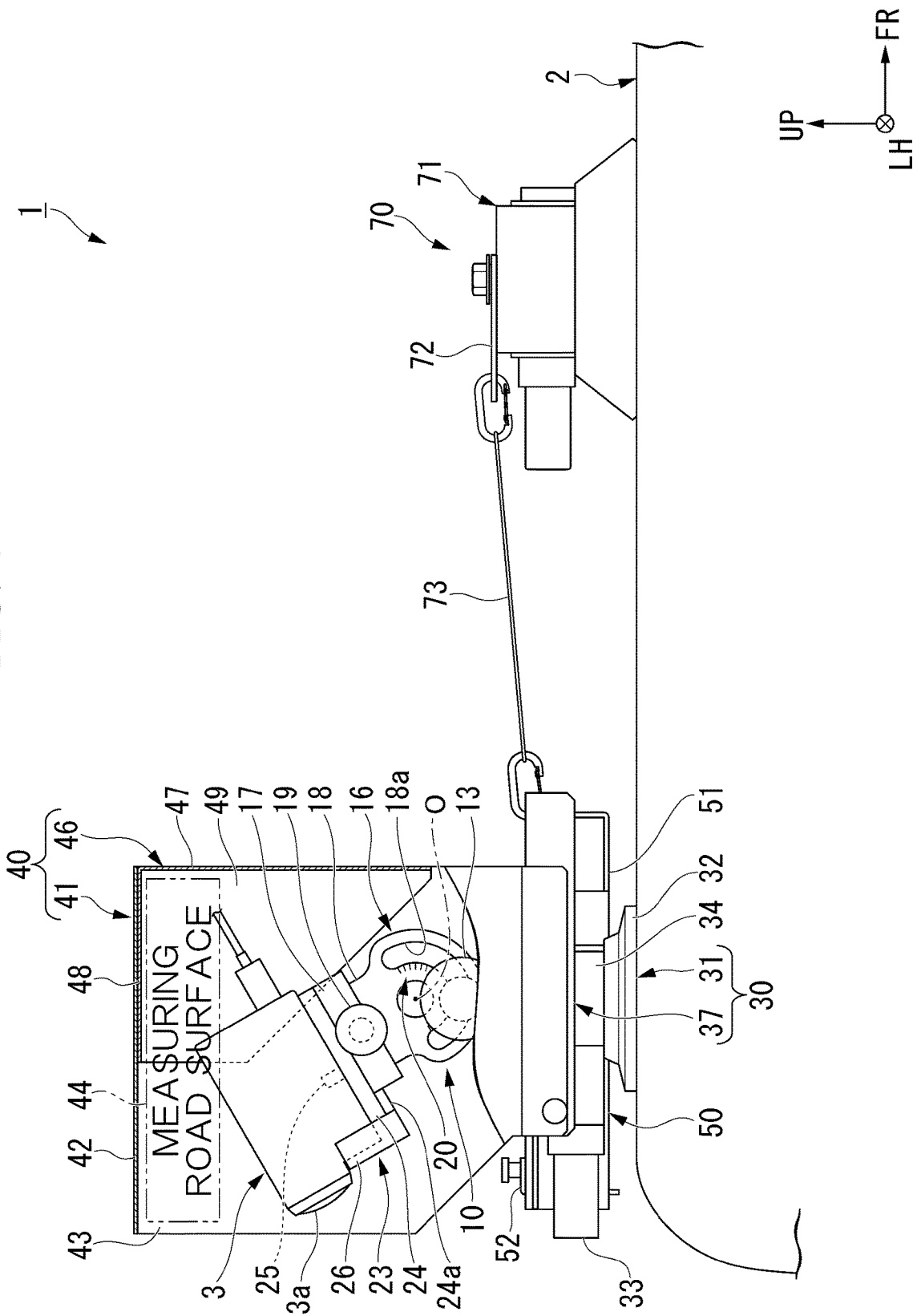
FIG. 4 is a side view showing the camera holder of the embodiment.

FIG. 4 is a side view of the camera holder of the embodiment viewed from the right side. In FIG. 4, the cover 40 is shown in a partially cutout state. As shown in FIG. 4, the camera holder 1 further includes a universal head 10 attached to an upper portion of the fixing member 30. The universal head 10 holds the camera 3 over the fixing member 30. The universal head 10 fixes the camera 3 in a state where a lens 3a of the camera 3 is directed toward the road surface behind the vehicle. The fixing member 30 includes adsorption portions 31 adsorbed to the upper surface of the vehicle body 2. Accordingly, the fixing member 30 is detachably adsorbed to the vehicle body 2. The cover 40 is attached to the upper portion of the fixing member 30. The cover 40 is provided to cover the camera 3 from above and the front. The auxiliary adsorption portion 71 of the fall prevention member 70 is detachably adsorbed to the upper surface of the vehicle body 2. The coupling member 73 of the fall prevention member 70 is apart from the vehicle body 2.

Figure 5:
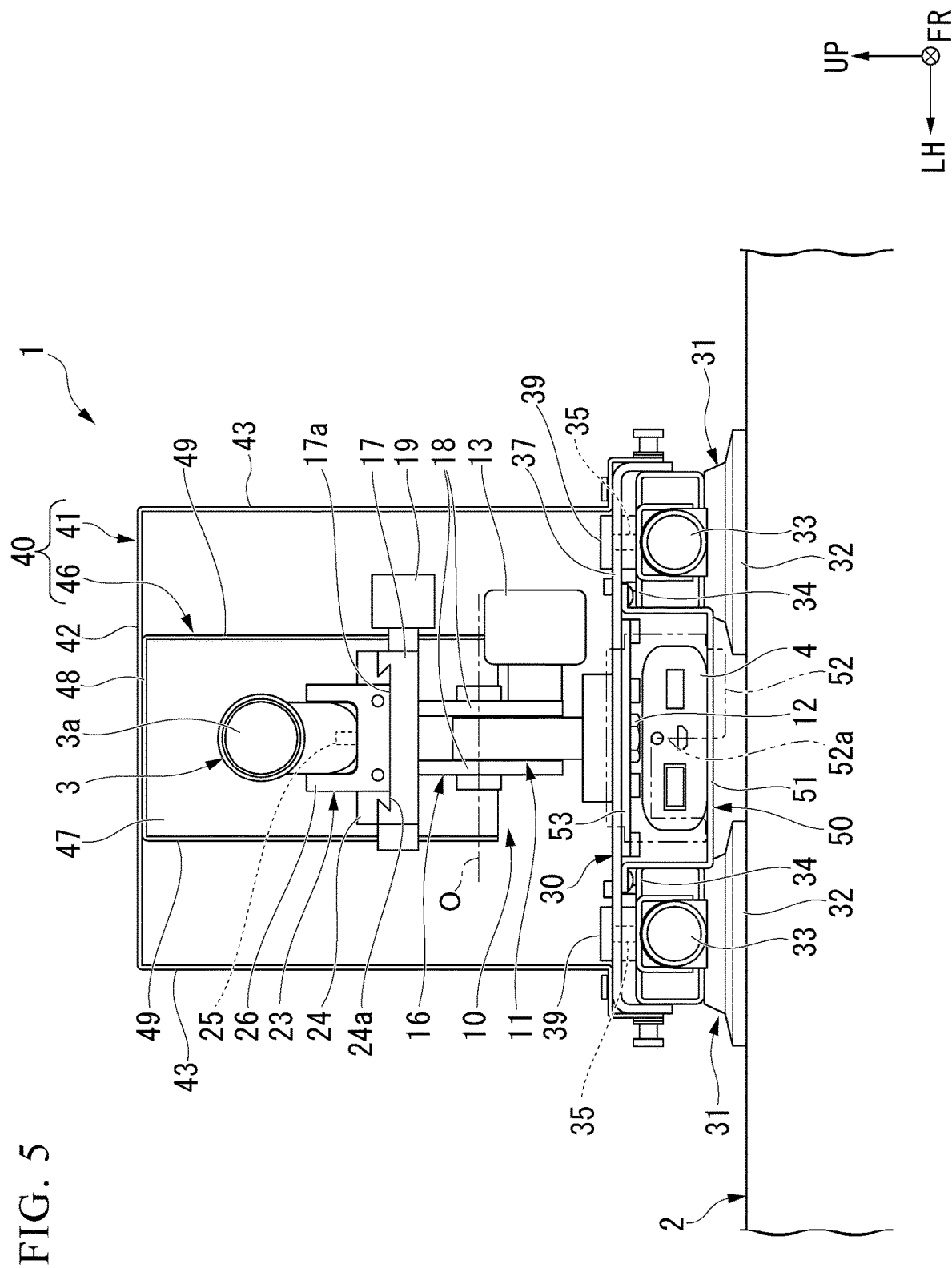
FIG. 5 is a rear view showing the camera holder of the embodiment.

FIG. 5 is a rear view of the camera holder of the embodiment viewed from the rear side. FIG. 5 shows a state where a lid member 52 (which will be described below) is detached. Therefore, the lid member 52 is indicated by an imaginary line. As shown in FIG. 5, the camera holder 1 further includes a battery holder 50 which can hold a first battery 4 supplying power to the camera 3. The battery holder 50 is provided between the fixing member 30 and the vehicle body 2. The cover 40 is provided to cover the camera 3 further from both left and right sides in addition to from above and the front.

Figure 6:
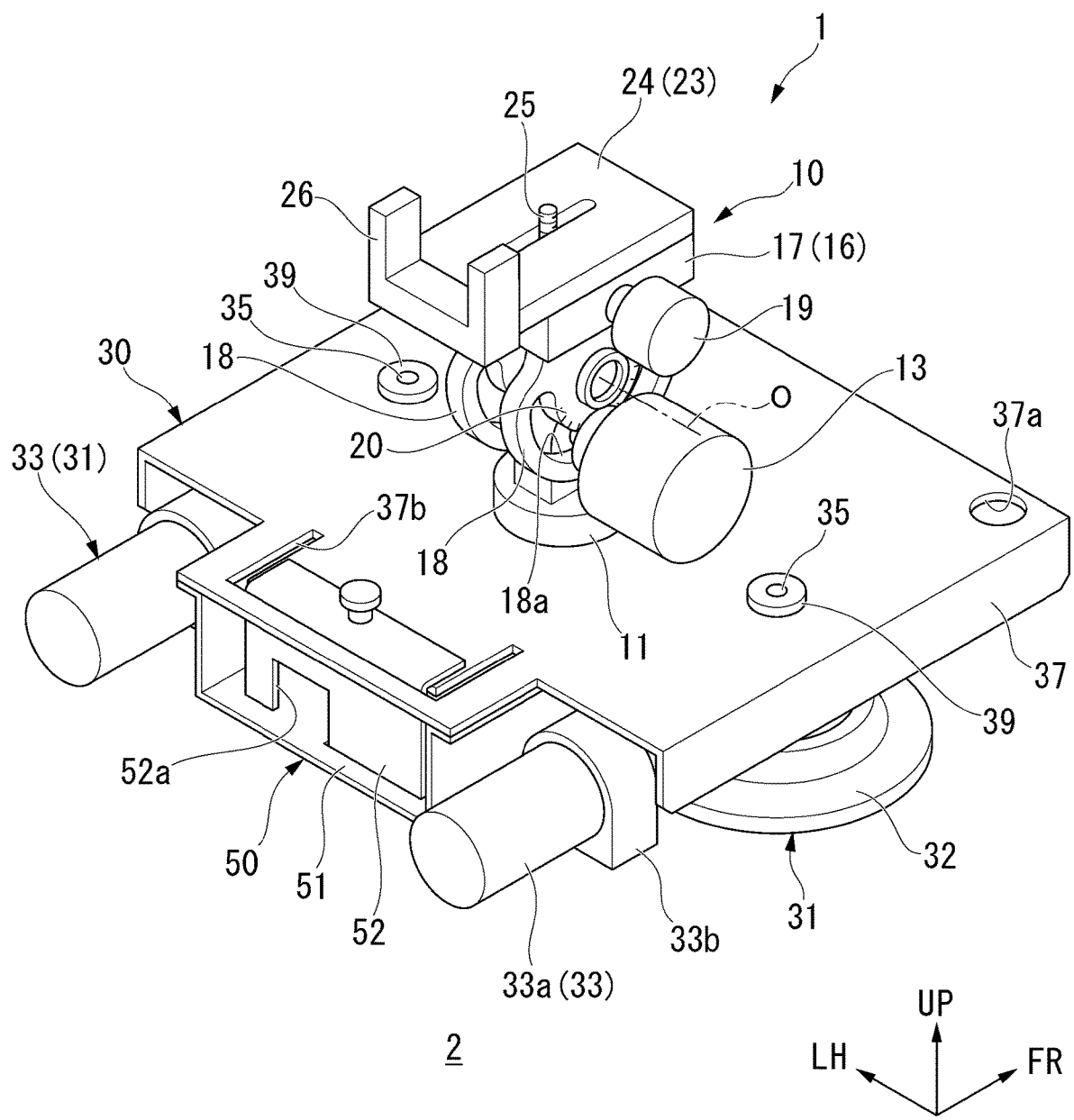
FIG. 6 is a perspective view showing a part of the camera holder of the embodiment.

Here, a detailed constitution of the camera holder 1 of the embodiment will be described. FIG. 6 is a perspective view showing a part of the camera holder of the embodiment. As shown in FIG. 6, the fixing member 30 is attached to the vehicle body 2 in a detachably adsorbed manner. The fixing member 30 fixes the universal head 10 to the vehicle body 2 such that a horizontal image capturing angle of the camera 3 attached to the universal head 10 can be adjusted. The fixing member 30 includes a pair of adsorption portions 31 and brackets 37 which are fixed to the pair of adsorption portions 31.

The pair of adsorption portions 31 are provided side by side at an interval from each other in the left-right direction. Each of the adsorption portions 31 includes a suction cup 32 adsorbed to the upper surface of the vehicle body 2, a pump 33 that suctions air inside the suction cup 32, a frame body 34 (refer to FIG. 5) supporting the suction cup 32 and the pump 33, and a mounting screw 35 protruding upward from the frame body 34.

The pump 33 includes a piston 33a and a cylinder 33b. The pump 33 raises a negative pressure inside the suction cup 32 by repetitively thrusting the piston 33a into the cylinder 33b. The piston 33a is drawn into the cylinder 33b as the negative pressure inside the suction cup 32 rises. A marking (not shown) is provided on an outer circumferential surface of the piston 33a. Adsorption of the adsorption portions 31 is completed after the pump 33 repetitively thrusts the piston 33a until the marking cannot be visually recognized.

For example, the bracket 37 is formed of a metal plate material such as aluminum. Left and right end portions of bracket 37 are folded downward. The end portion of the bracket 37 on the left side faces the frame body 34 (refer to FIG. 5) of the adsorption portion 31 on the left side from the left side. The end portion of the bracket 37 on the right side faces the frame body 34 (refer to FIG. 5) of the adsorption portion 31 on the right side from the right side. Engagement holes 37a, with which the coupling members 73 (which will be described below) are engaged, are provided on both left and right sides in front end portions of the brackets 37. The brackets 37 are fixed to the adsorption portions 31 using a pair of nuts 39 fastened to the mounting screws 35 of the adsorption portions 31.

The universal head 10 can adjust a tilting angle of the camera 3. The tilting angle of the camera 3 is an angle around an axis in the left-right direction and is an inclination angle (elevation/depression angle) of an optical axis of the camera 3 with respect to the horizontal surface. The universal head 10 includes a universal head base 11 fixed to the fixing member 30, a tilting portion 16 tiltably supported by the universal head base 11, and a slider 23 attached to the tilting portion 16 in a slidably movable manner.

The universal head base 11 is provided over the fixing member 30. The universal head base 11 is provided at the same position as the suction cups 32 of the pair of adsorption portions 31 in the front-rear direction. A female screw (not shown) is provided on a lower surface of the universal head base 11. The universal head base 11 is fixed to the upper surfaces of the brackets 37 using a bolt 12 (refer to FIG. 5) screwed into the female screw on the lower surface of the universal head base 11. A first damper 13 which can restrict tilting of the tilting portion 16 is attached to the universal head base 11.

The tilting portion 16 includes a base 17 supporting the slider 23, and a pair of legs 18 extending from the base 17 and sandwiching the universal head base 11 from both left and right sides.

The base 17 is formed to have a rectangular parallelepiped shape. The base 17 has an upper surface and a lower surface facing sides opposite to each other, and four side surfaces having smaller areas than the upper surface and the lower surface. The base 17 is disposed such that a pair of side surfaces are directed in the left-right direction and the lower surface faces the universal head base 11. A groove 17a (refer to FIG. 5) into which the slider 23 is slidably fitted is formed on the upper surface of the base 17. The groove 17a extends in a direction orthogonal to the left-right direction and opens on a side surface directed in a direction orthogonal to the left-right direction of the four side surfaces of the base 17. A second damper 19 which can restrict movement of the slider 23 fitted into the groove 17a of the base 17 is attached to the side surface directed to the right side of the base 17.

Each of the pair of legs 18 is formed to have a flat plate shape. The pair of legs 18 stand upright on the lower surface of the base 17. The pair of legs 18 extend substantially parallel to and at an interval from each other in the left-right direction. The pair of legs 18 are supported by an upper end portion of the universal head base 11 such that they can rotate around a rotation axis O in the left-right direction.

A long hole 18a extending in an arc shape about the rotation axis O is formed in each of the legs 18. An axis portion of the long hole 18a is inserted through the first damper 13. Accordingly, the tilting portion 16 is provided to be able to tilt around the rotation axis O with respect to the universal head base 11 and to be able to be fixed at a freely-selected tilting angle. In the present embodiment, the tilting portion 16 is provided to turn within an angle range of approximately 90° to the front and the rear from the state where the upper surface of the base 17 is directed upward. Gradations 20 indicating the tilting angles of the tilting portion 16 with respect to the universal head base 11 are provided in the legs 18. That is, the gradations 20 indicate the tilting angles of the camera 3 attached to the universal head 10 with respect to the vehicle body 2.

The slider 23 includes a main body 24 formed to have a rectangular parallelepiped shape, a camera mounting screw 25 protruding from the upper surface of the main body 24, and a camera holding member 26 attached to a rear end portion of the main body 24.

The main body 24 is disposed to face the upper surface of the base 17 of the tilting portion 16. The main body 24 includes a lower surface facing the upper surface of the base 17 of the tilting portion 16, and an upper surface facing a side opposite to the lower surface. A projected portion 24a slidably fitted into the groove 17a of the base 17 of the tilting portion 16 is formed on the lower surface of the main body 24 (refer to FIG. 5). The camera 3 is mounted on the upper surface of the main body 24. The camera 3 is fastened by the camera mounting screw 25.

The camera holding member 26 is detachably fixed to the main body 24. The camera holding member 26 is formed to have a U-shape which opens upward when viewed in the front-rear direction. The camera holding member 26 sandwiches the camera 3 fastened by the camera mounting screw 25 from both left and right sides (refer to FIG. 5). Accordingly, the camera holding member 26 restricts rotation of the camera 3 about the camera mounting screw 25.

The battery holder 50 holds the first battery 4 (refer to FIG. 5) formed to have a rectangular parallelepiped shape. The battery holder 50 holds the first battery 4 between the pair of adsorption portions 31. The battery holder 50 includes a support member 51, the lid member 52, and a heat shielding member 53 (refer to FIG. 5).

The support member 51 is provided between the frame bodies 34 (refer to FIG. 5) of the pair of adsorption portions 31 in the left-right direction. For example, the support member 51 is formed of a metal plate material such as aluminum. The support member 51 supports the first battery 4 from below, the front, and both left and right sides. The inner side of the support member 51 opens rearward. The first battery 4 can be inserted into the support member 51 from the rear side. The support member 51 is fixed to the lower surfaces of the brackets 37. A cushioning material for preventing vibration or the like of the first battery 4 may be suitably disposed on the inner side of the support member 51.

The lid member 52 prevents falling of the first battery 4 inserted into the support member 51. The lid member 52 is provided to block at least a part of a rear portion opening of the support member 51. For example, the lid member 52 is formed of a metal plate material such as aluminum. The lid member 52 is formed to have a U-shape which opens forward when viewed in the up-down direction. The lid member 52 is provided to be inserted through slits 37b formed in the brackets 37 of the fixing member 30 and to be able to slide in the up-down direction. The lid member 52 opens the rear portion opening of the support member 51 by moving upward from a state where the rear portion opening of the support member 51 is blocked. A window 52a is formed in the lid member 52. The window 52a exposes a part of a side surface of the first battery 4 to the rear side in a state where the lid member 52 blocks the rear portion opening of the support member 51. Accordingly, the first battery 4 can expose a power source terminal provided on the side surface to the outside of the battery holder 50 in a state where the lid member 52 prevents the first battery 4 from falling off.

Returning to FIG. 5, the heat shielding member 53 is disposed between the first battery 4 supported by the support member 51, and the brackets 37 of the fixing member 30. The heat shielding member 53 prevents heat conduction from the brackets 37 to the first battery 4. The heat shielding member 53 is formed of a resin material. The heat shielding member 53 is formed to have a duckboard shape and is reduced in weight. The heat shielding member 53 is fastened and fixed to the lower surfaces of the brackets 37.

Figure 7:
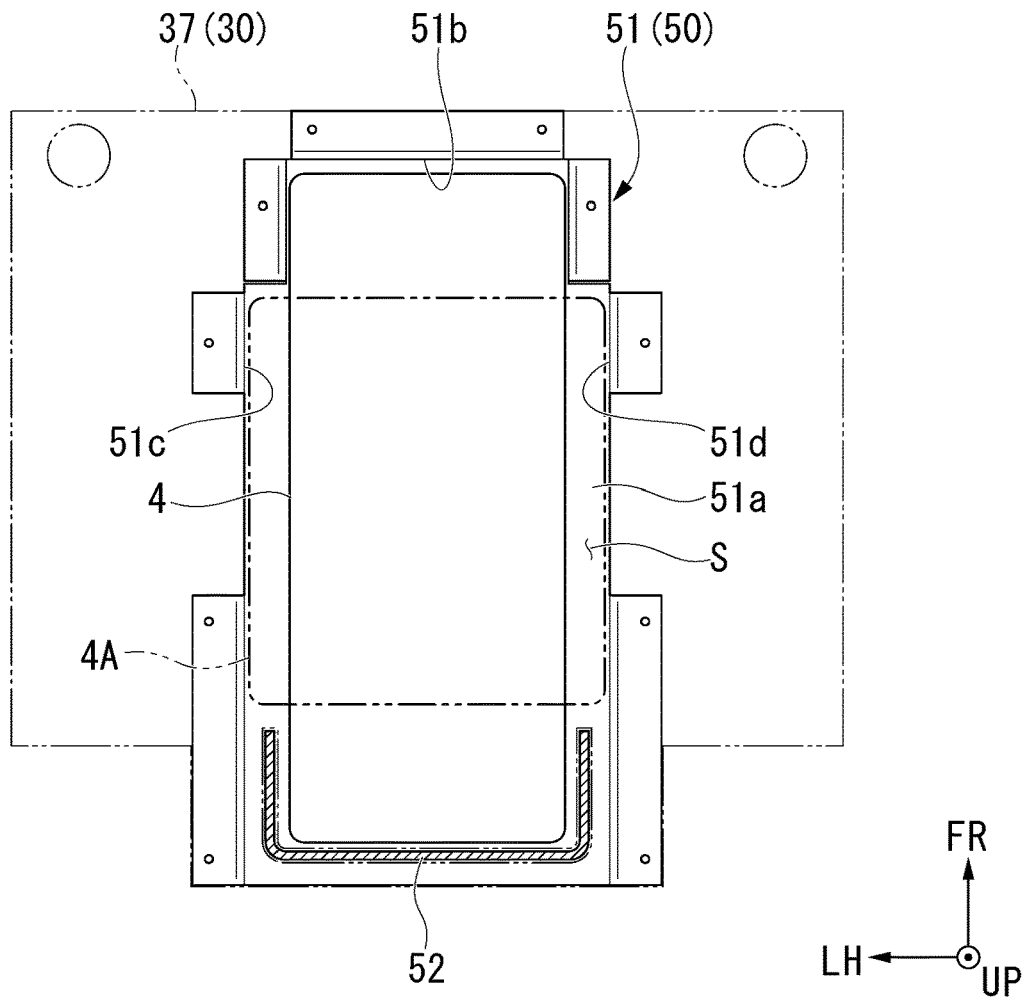
FIG. 7 is a plan view showing an internal structure of a battery holder.

FIG. 7 is a plan view showing an internal structure of a battery holder. As shown in FIG. 7, the support member 51 includes a bottom plate 51a, a front side plate 51b, a left side plate 51c, and a right side plate 51d. The bottom plate 51a defines a battery space S, in which the first battery 4 is disposed, from below. The bottom plate 51a extends in the horizontal direction. The front side plate 51b defines the battery space S from the front. The front side plate 51b extends along a vertical surface in the front-rear direction. The left side plate 51c defines the battery space S from the left. The left side plate 51c extends along a vertical surface in the left-right direction. The right side plate 51d defines the battery space S from the right. The right side plate 51d extends along a vertical surface in the left-right direction.

The left side plate 51c and the right side plate 51d are formed such that front portions are closer to each other in the left-right direction than other parts. A gap between the front portions of the left side plate 51c and the right side plate 51d corresponds to the length of the first battery 4 in the left-right direction. Accordingly, the battery holder 50 can hold the first battery 4 in a state where deviation in the left-right direction is restricted in the front portions. In addition, in place of the first battery 4, the battery holder 50 can hold a second battery 4A having a larger length in the left-right direction than the first battery 4 in a state where deviation in the left-right direction is restricted in an intermediate portion in the front-rear direction. That is, the battery holder 50 can selectively hold the first battery 4 and the second battery 4A which has a different shape in a plan view from the first battery 4. Similar to the first battery 4, the second battery 4A is a battery supplying power to the camera 3.

Returning to FIGS. 4 and 5, the cover 40 includes an outer cover 41 and an inner cover 46.

For example, the outer cover 41 is formed of one piece of plate material constituted of a metal material such as aluminum. The outer cover 41 includes a top plate portion 42 (top plate cover) covering the camera 3 in its entirety from above, and a pair of side plate portions 43 covering the camera 3 in its entirety from both left and right sides. The top plate portion 42 is formed to have a rectangular shape extending in both directions such as the left-right direction and the front-rear direction (also refer to FIG. 3). The top plate portion 42 is provided to overlap the camera 3 in its entirety when viewed in the up-down direction. The pair of side plate portions 43 extend downward from both left and right side edges of the top plate portion 42. A lower end portion at a front end edge of each of the side plate portions 43 extends forward as it goes downward from above. The lower end portion of each of the side plate portions 43 is detachably fixed to the upper surface of the bracket 37. The pair of side plate portions 43 are provided to overlap the camera 3 in its entirety when viewed in the left-right direction. Displays 44 indicating that a road surface is being measured are provided on outer surfaces of the side plate portions 43. A space inside the outer cover 41 opens to both front and rear sides. Accordingly, a wind pressure acting on the outer cover 41 while the vehicle travels can be reduced.

The inner cover 46 is disposed inside the outer cover 41. The inner cover 46 includes a front wall portion 47 (side cover), an upper wall portion 48, and a pair of side wall portions 49.

The front wall portion 47 is formed to have a rectangular plate shape extending in both directions such as the up-down direction and the left-right direction. The front wall portion 47 covers the camera 3 from the front. The front wall portion 47 is provided to overlap the camera 3 when viewed in the front-rear direction. The front wall portion 47 is disposed at the same position as the front end edge of the outer cover 41 in the front-rear direction. The length of the front wall portion 47 in the left-right direction is smaller than a gap between the pair of side plate portions 43 of the outer cover 41. The lower end edge of the front wall portion 47 is provided substantially at the same position as the rotation axis O in the up-down direction.

The upper wall portion 48 is formed to have a rectangular plate shape extending rearward from the upper end edge of the front wall portion 47. The upper wall portion 48 faces the lower surface of the top plate portion 42 of the outer cover 41. The upper wall portion 48 is joined to the top plate portion 42 of the outer cover 41 through welding or the like.

The pair of side wall portions 49 extend rearward from both left and right side edges of the front wall portion 47. Each of the side wall portions 49 is formed to have a trapezoidal plate shape when viewed in the left-right direction. The front end edge and the rear end edge of each of the side wall portions 49 are provided parallel to each other and extend in the up-down direction. The entire upper end edge of each of the side wall portions 49 is connected to the entire side edge of the upper wall portion 48 in the left-right direction. The lower end edge of each of the side wall portions 49 is inclined such that the rear end portion is positioned above the front end portion.

Figure 8:
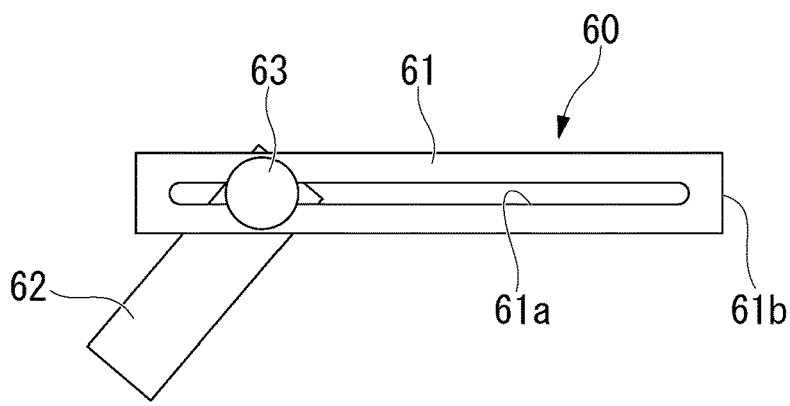
FIG. 8 is a plan view showing a direction adjustment tool.

FIG. 8 is a plan view showing a direction adjustment tool used when the camera holder 1 is attached to the vehicle body 2. As shown in FIG. 8, a direction adjustment tool 60 includes a first part 61 which extends in a first longitudinal direction, and a second part 62 which is coupled to the first part 61 and extends in a second longitudinal direction. A long hole 61a extending in the first longitudinal direction is formed in the first part 61. The second part 62 is fixed to the first part 61 using a screw 63 inserted through the long hole 61a of the first part 61. In the second part 62, a position in the first longitudinal direction with respect to the first part 61, and an intersection angle in the second longitudinal direction with respect to the first longitudinal direction can be adjusted by loosening the screw 63. Gradations indicating positions of the second part 62 may be provided in the first part 61.

As described above, when the camera 3 is attached to the vehicle body 2 via the fixing member 30 and the universal head 10, the camera 3 can capture an image. In the present embodiment, the fall prevention member 70 is provided in order to more firmly fix the fixing member 30. Returning to FIG. 3, a structure of the fall prevention member 70 will be described.

As shown in FIG. 3, the fall prevention member 70 is detachably attached to a place spaced apart from an attachment place of the fixing member 30 in the vehicle body 2. The fall prevention member 70 is coupled to the fixing member 30. The fall prevention member 70 includes the auxiliary adsorption portion 71, a stay 72, and a pair of coupling members 73.

The auxiliary adsorption portion 71 has a constitution similar to those of the adsorption portions 31 of the fixing member 30. In the present embodiment, the auxiliary adsorption portion 71 is formed to have a larger size than the adsorption portions 31 of the fixing member 30.

The stay 72 connects the auxiliary adsorption portion 71 and the pair of coupling members 73 to each other. The stay 72 extends in the front-rear direction. The front end portion of the stay 72 is fastened and fixed to the auxiliary adsorption portion 71. A penetration hole 72a is formed in the rear end portion of the stay 72 with which the coupling members 73 are engaged.

The coupling members 73 are members including hooks at both ends of metal wires. The coupling members 73 cause the fixing member 30 and the auxiliary adsorption portion 71 to be coupled to each other. One end portion of each of the coupling members 73 is engaged with the penetration hole 72a in the rear end portion of the stay 72. The other end portion of each of the coupling members 73 is engaged with the engagement hole 37a of the bracket 37 of the fixing member 30. Accordingly, the coupling members 73 are connected to the fixing member 30 and a place spaced apart from the attachment place of the fixing member 30 in the vehicle body 2. The coupling members 73 may be connected to a roof rail of the vehicle body 2.

Figure 9:
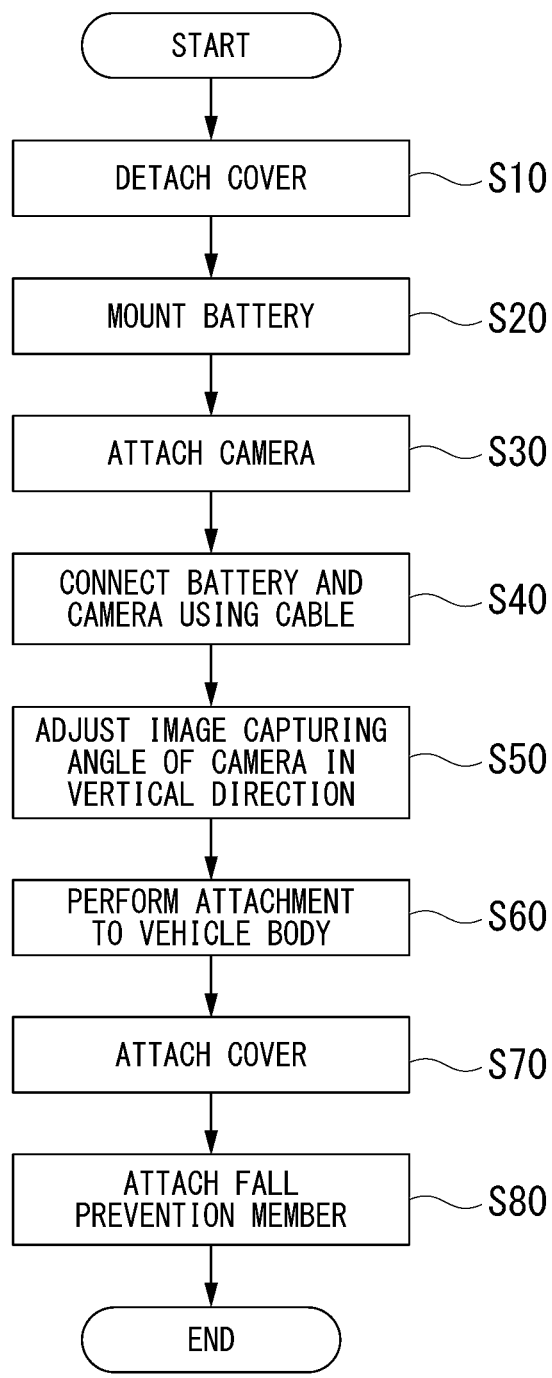
FIG. 9 is a flowchart showing a procedure of attaching the camera holder of the embodiment.

Subsequently, a procedure of attaching the camera holder 1 to the vehicle body 2 will be described. FIG. 9 is a flowchart showing a procedure of attaching the camera holder of the embodiment. As shown in FIG. 9, first, the camera 3 is attached to the fixing member 30. The camera 3 is attached before the fixing member 30 is attached to the vehicle body 2.

First, in order to facilitate attachment of the camera 3, the cover 40 is detached from the fixing member 30 (Step S10). When the cover 40 is detached, as shown in FIG. 6, the fixing member 30 and the universal head 10 are in a fixed state.

Subsequently, either the first battery 4 or the second battery 4A is mounted in the battery holder 50 (Step S20). A suitable battery is selected and mounted based on a relationship with a battery capacity, a connection terminal of the camera, or the like. Depending on the shape of the battery, as shown in FIG. 7, in the case of the first battery 4, the battery is mounted by being inserted between the front portions of the left side plate 51c and the right side plate 51d of the battery holder 50. In the case of the second battery 4A, the battery is mounted by being inserted between front and rear intermediate portions of the left side plate 51c and the right side plate 51d of the battery holder 50. Thereafter, the lid member 52 is attached, and therefore the battery is fixed. At this time, when the first battery 4 is mounted, the rear end portion of the first battery 4 enters the inside of the lid member 52 having a U-shape in a top view. Accordingly, displacement of the first battery 4 in the front-rear direction is restricted. In addition, when the second battery 4A is mounted, the rear end surface of the second battery 4A can abut the front end edge of the lid member 52. Accordingly, displacement of the second battery 4A in the front-rear direction is restricted.

Subsequently, the camera 3 is attached to the universal head 10 (Step S30). In Step S30, in a state where the slider 23 is detached from the tilting portion 16, the camera mounting screw 25 of the slider 23 is screwed into a female screw (not shown) formed on the lower surface of the camera 3, and the camera 3 is fixed to the slider 23. Thereafter, the slider 23 is attached to the tilting portion 16, and therefore the camera 3 is attached to the universal head 10. In this stage, the camera 3 is only fixed to the universal head 10, and angle adjustment will be performed later.

Work processes of Steps S20 and S30 are not limited to this order. For example, the work of Step S30 may be performed prior to the work of Step S20.

Subsequently, the battery and the camera 3 mounted in the battery holder 50 are connected to each other using a cable (Step S40). At this time, the cable is laid below the camera 3, for example, such that the cable does not enter an image captured by the camera 3.

Subsequently, an image capturing angle of the camera 3 in the vertical direction is adjusted (Step S50). In Step S50, the image capturing angle in the vertical direction is adjusted by adjusting the tilting angle of the camera 3. Specifically, in Step S50, the tilting angle of the tilting portion 16 of the universal head 10 is set to a predetermined angle set in advance. Here, the predetermined angle is an optimized angle based on the vehicle type of the vehicle body 2. The predetermined angle is an angle which is adjusted while watching an image captured by the camera 3 such that an image of a road surface as shown in FIG. 2 can be captured, when the camera holder 1 is attached to the vehicle body 2 for the first time. When the angle is set to the predetermined angle, the first clamper 13 is loosened, the inclination angle of the tilting portion 16 is adjusted with reference to the angles indicated in the gradations 20, and the first damper 13 is tightened.

Subsequently, the camera holder 1 is attached to the vehicle body 2 (Step S60). In Step S60, the horizontal image capturing angle of the camera 3 is adjusted, and the fixing member 30 is attached to the vehicle body 2.

In Step S60, first, the horizontal image capturing angle of the camera 3 is adjusted. First, the fixing member 30 is temporarily positioned at a desired installation position on the upper surface of the vehicle body 2. Next, the attachment position of the fixing member 30 is adjusted such that the optical axis of the camera 3 is laid in the front-rear direction when viewed in the up-down direction. The attachment position of the fixing member 30 is adjusted using the direction adjustment tool 60.

The direction adjustment tool 60 is used through the following procedure. The direction adjustment tool 60 causes a first end portion 61b of the first part 61 to abut a first place on the fixing member 30 from the rear side. For example, the first place is the rear right end portion of the bracket 37. Next, the screw 63 is loosened such that the second part 62 can slide. Next, in a state where the second part 62 slides and comes into contact with the rear end edge on the upper surface of the vehicle body 2, the screw 63 is tightened, and the first part 61 and the second part 62 are fixed to each other. Next, the first end portion 61b of the first part 61 is caused to abut a second place on the fixing member 30 from the rear side. The second place on the fixing member 30 is a place positioned at the same position as the first place in the optical axis direction of the camera 3 and on a side opposite to the first place with the optical axis of the camera 3 sandwiched therebetween when viewed in the up-down direction. For example, when the first place is the rear right end portion of the bracket 37, the second place is the rear left end portion of the bracket 37. At this time, if the second part 62 comes into contact with the rear end edge on the upper surface of the vehicle body 2, the optical axis of the camera 3 is in a state of being directed straight to the rear side of the vehicle body 2, and positional adjustment of the fixing member 30 is completed. Thus, adjustment of the horizontal image capturing angle of the camera 3 is completed.

Next, the fixing member 30 is attached to the vehicle body 2. Specifically, the adsorption portions 31 are adsorbed to the upper surface of the vehicle body 2 by repetitively thrusting the pistons 33a of the pair of adsorption portions 31. Accordingly, the fixing member 30 is attached to the vehicle body 2. In order to increase an adsorption force of the suction cup 32, the suction cup 32 is coated with grease and is attached to the vehicle body 2, and therefore the adsorption force can be improved. Thus, work of Step S60 is completed.

Subsequently, the cover 40 is attached to the fixing member 30 (Step S70). Thus, attachment of the camera 3 to the vehicle body 2 is completed.

When attachment is performed through the foregoing procedure, the camera 3 can be attached to the vehicle body 2. However, in order to further prevent falling, the fall prevention member 70 is attached to the vehicle body 2 (Step S80). First, the coupling members 73 are engaged with the engagement holes 37a of the fixing member 30. Subsequently, the auxiliary adsorption portion 71 is temporarily positioned in front of the fixing member 30 on the upper surface of the vehicle body 2. At this time, the auxiliary adsorption portion 71 is disposed at a position where the coupling members 73 are not loosened. Subsequently, similar to attachment of the fixing member 30, the auxiliary adsorption portion 71 is adsorbed to the upper surface of the vehicle body 2 by repetitively thrusting the piston of the auxiliary adsorption portion 71. Thus, attachment of the camera holder 1 to the vehicle body 2 is completed.

The camera holder 1 may be detached from the vehicle body 2 by inversely performing the attachment procedure described above. At this time, the fixing member 30 is detached from the vehicle body 2 by desorbing the suction cups 32 of the adsorption portions 31 from the vehicle body 2. The same applies to the auxiliary adsorption portion 71.

In the embodiment described above, the camera holder 1 includes the universal head 10 to which the camera 3 is attached, and the fixing member 30 which is detachably adsorbed to the vehicle body 2 and fixes the universal head 10 to the vehicle body 2 such that the horizontal image capturing angle of the camera 3 can be adjusted. According to this constitution, a camera can be attached to a general vehicle, and an image of a road surface can be captured. Therefore, monitoring of road surface conditions can be executed without using a dedicated vehicle to which a camera or the like is attached.

In addition, since the camera holder 1 includes the battery holder 50 which can hold the first battery 4, a long-term image of a road surface can be captured by the camera 3. Accordingly, a wide range of a road surface can be captured at a time. Therefore, the efficiency of monitoring the road surface conditions can be improved.

In addition, the battery holder 50 can selectively hold the first battery 4 and the second battery 4A which has a different shape in a plan view from the first battery 4. Accordingly, batteries of a plurality of kinds can be used, and thus usability of the camera holder 1 can be improved.

In addition, since the gradations 20 indicating the tilting angles of the camera 3 are provided in the universal head 10, reproducibility of the tilting angle at the time of attachment of the camera 3 can be enhanced. Accordingly, erroneous adjustment of the tilting angle of the camera 3 can be prevented. Therefore, it is possible to prevent erroneous image capturing, for example, in which the vehicle body 2 is photographed in a captured image.

In addition, since the camera holder 1 is attached to the vehicle body 2 using the direction adjustment tool 60, tilting of the optical axis of the camera 3 in the horizontal direction with respect to the front-rear direction can be prevented. Accordingly, an image of a road surface behind the vehicle can be reliably captured by the camera 3.

In addition, since the camera holder 1 includes the cover 40 covering the camera 3, the camera 3 can be protected.

Moreover, since the cover 40 includes the top plate portion 42 covering the lens 3a of the camera 3 from above, direct rays of the sun to the lens 3a of the camera 3 can be inhibited, and quality deterioration of an image or a video image captured by the camera 3 can be prevented. In addition, a problem caused by a temperature rise of the camera 3 and occurrence of a malfunction can be prevented.

Moreover, since the cover 40 includes the pair of side plate portions 43 covering the camera 3 from both left and right sides, sunlight incident on the lens 3a of the camera 3 from both left and right sides can be inhibited, and quality deterioration of an image or a video image captured by the camera 3 can be prevented. In addition, a problem caused by a temperature rise of the camera 3 and occurrence of a malfunction can be prevented.

Moreover, since the cover 40 includes the front wall portion 47 of the inner cover 46 covering the camera 3 from the front, that is, in one horizon direction, it is possible to prevent a situation in which raindrops hit the camera 3 from the front and the camera 3 becomes wet while the vehicle is traveling. Accordingly, it is possible to prevent a malfunction of the camera 3 due to raindrops and occurrence of quality deterioration or the like of a captured image (video image) due to raindrops adhered to the lens 3a of the camera 3. In addition, since the front wall portion 47 covers the camera 3 from the front, it is possible to prevent direct rays of the sun to the main body of the camera 3 from the front and a rise of the temperature of the camera 3. Accordingly, occurrence of a malfunction due to a temperature rise of the camera 3 can be prevented.

In addition, the camera holder 1 includes the fall prevention member 70 coupled to the fixing member 30. The fall prevention member 70 is detachably attached to a place spaced apart from the attachment place of the fixing member 30 in the vehicle body 2. Accordingly, the fixing member 30 is attached to a place spaced apart from the attachment place of the fixing member 30 in the vehicle body 2 via the fall prevention member 70 in addition to that the fixing member 30 itself is attached to the vehicle body 2. Therefore, even if the fixing member 30 falls off from the vehicle body 2 while the vehicle is traveling, falling of the camera 3 from the vehicle body 2 together with the fixing member 30 and the universal head 10 can be prevented.

In the foregoing embodiment, the fixing member 30 includes the pair of adsorption portions 31, but the embodiment is not limited thereto. One, three, or more adsorption portions may be included. In addition, in the foregoing embodiment, the fixing member 30 is detachably attached to the vehicle body 2 using the suction cups 32, but the embodiment is not limited thereto. For example, a fixing member may be attached by being detachably adsorbed to the vehicle body 2 using a magnet or the like.

In addition, in the foregoing embodiment, the top plate portion 42 of the outer cover 41 is provided to cover the camera 3 in its entirety from above, but the embodiment is not limited thereto. A top plate portion of an outer cover need only be provided to cover at least the lens 3a of the camera 3 from above. That is, if a top plate portion of an outer cover is provided to overlap the lens 3a of the camera 3 when viewed at least in the up-down direction, it is possible to prevent direct rays of the sun to the lens 3a of the camera 3 as described above.

In addition, in the foregoing embodiment, the lid member 52 of the battery holder 50 opens and closes the rear portion opening of the support member 51 by slidably moving in the up-down direction, but the embodiment is not limited thereto. For example, a lid member may be provided to open and close the rear portion opening of the support member 51 using a hinge or the like.

In addition, in the foregoing embodiment, the attachment position of the fixing member 30 is adjusted using the direction adjustment tool 60 which is separate from the camera holder 1, but the embodiment is not limited thereto. For example, a member corresponding to the direction adjustment tool 60 may be attached to the camera holder 1 in advance.

In addition, in the foregoing embodiment, one end portion of the coupling member 73 is engaged with the penetration hole 72a of the rear end portion of the stay 72 such that the fixing member 30 and the auxiliary adsorption portion 71 are coupled to each other, but the embodiment is not limited thereto. For example, one end portion of the coupling member 73 may be engaged with the roof rail of the vehicle. Accordingly, the coupling member 73 is connected to each of the fixing member 30 and a place spaced apart from the attachment place of the fixing member 30 in the vehicle body 2. According to this constitution, the fixing member 30 is attached to a place spaced apart from the attachment place of the fixing member 30 in the vehicle body 2 via the coupling member 73 in addition to that the fixing member 30 itself is attached to the vehicle body 2. Therefore, even if the fixing member 30 falls off from the vehicle body 2 while the vehicle is traveling, falling of the camera 3 from the vehicle body 2 together with the fixing member 30 and the universal head 10 can be prevented.

In addition, in the foregoing embodiment, the camera 3 is a video camera, but the embodiment is not limited thereto. A camera which can capture only a still image may be adopted.

According to at least one embodiment described above, a camera holder includes a universal head to which a camera is attached, and a fixing member which is attached by being detachably adsorbed to a vehicle body and fixes the universal head to the vehicle body. Accordingly, the camera can be attached to a general vehicle, and an image of a road surface can be captured. Therefore, monitoring of road surface conditions can be executed without using a dedicated vehicle to which a camera or the like is attached.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera holder comprising:
a universal head to which a camera is attached and which is able to adjust a tilting angle of the camera;
a fixing member which is detachably adsorbed to a vehicle body and fixes the universal head to the vehicle body such that a horizontal image capturing angle of the camera attached to the universal head is able to be adjusted;
a fall prevention member which has an adsorption portion detachably attached to a place spaced apart from an attachment place of the fixing member and on an upper surface of the vehicle body in front of the fixing member;
a coupling member which causes the fixing member and the fall prevention member to be coupled to each other; and
a battery holder which is able to hold a battery supplying power to the camera,
wherein the battery holder is able to selectively hold a first battery and a second battery which has a different shape in a plan view from the first battery and supplies power to the camera.

2. The camera holder according to claim 1, further comprising:
a top plate cover which covers the camera from above; and
a side cover which covers the camera in one horizon direction.

3. A camera holder comprising:
a universal head to which a camera is attached and which is able to adjust a tilting angle of the camera;
a fixing member which is detachably adsorbed to a vehicle body and fixes the universal head to the vehicle body such that a horizontal image capturing angle of the camera attached to the universal head is able to be adjusted;

a fall prevention member which has an adsorption portion detachably attached to a place spaced apart from an attachment place of the fixing member and on an upper surface of the vehicle body in front of the fixing member; and a coupling member which causes the fixing member and the fall prevention member to be coupled to each other, wherein the universal head has gradations which are provided thereon and indicates the tilting angle of the camera.

4. The camera holder according to claim 3, further comprising:

a top plate cover which covers the camera from above; and a side cover which covers the camera in one horizon direction.

5. A method of attaching a camera holder which fixes a camera to an upper surface of a vehicle body, the method comprising:

mounting a first battery or a second battery that supplies power to the camera on a battery holder that can selectively hold the first battery and the second battery that has a different shape in a plan view from the first battery;

attaching the camera to a universal head;

adjusting a horizontal image capturing angle and a tilting angle of the camera;

by detachably adsorbing a fixing member to the vehicle body, attaching the fixing member to the vehicle body;

attaching a cover covering the camera;

attaching a fall prevention member to a place that is in front of the fixing member on the upper surface of the vehicle body and is separated from an attachment place; and causing the fixing member and the fall prevention member to be coupled to each other using a coupling member.

6. A method of attaching a camera holder which fixes a camera to an upper surface of a vehicle body, the method comprising:

mounting, on a battery holder, a battery supplying power to the camera;

attaching the camera to a universal head with gradations which are indicates the tilting angle of the camera;

adjusting a horizontal image capturing angle and a tilting angle of the camera by referring to the angles indicated in the gradations;

by detachably adsorbing a fixing member to the vehicle body, attaching the fixing member to the vehicle body;

attaching a cover covering the camera;

attaching a fall prevention member to a place that is in front of the fixing member on the upper surface of the vehicle body and is separated from an attachment place; and causing the fixing member and the fall prevention member to be coupled to each other using a coupling member.

* * * * *